United States Patent
Mindlin et al.

(10) Patent No.: US 10,979,842 B2
(45) Date of Patent: *Apr. 13, 2021

(54) METHODS AND SYSTEMS FOR PROVIDING A COMPOSITE AUDIO STREAM FOR AN EXTENDED REALITY WORLD

(71) Applicant: Verizon Patent and Licensing Inc., Arlington, VA (US)

(72) Inventors: Samuel Charles Mindlin, Brooklyn, NY (US); Mohammad Raheel Khalid, Budd Lake, NJ (US); Kunal Jathal, Los Angeles, CA (US); Shan Anis, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/601,884

(22) Filed: Oct. 15, 2019

(65) Prior Publication Data
US 2020/0084564 A1 Mar. 12, 2020

Related U.S. Application Data

(63) Continuation of application No. 16/126,289, filed on Sep. 10, 2018, now Pat. No. 10,484,811.

(51) Int. Cl.
*G10L 19/008* (2013.01)
*H04S 7/00* (2006.01)
*H04S 3/00* (2006.01)
*H04L 29/08* (2006.01)

(52) U.S. Cl.
CPC ............ *H04S 7/303* (2013.01); *G10L 19/008* (2013.01); *H04S 3/008* (2013.01); *H04L 67/10* (2013.01); *H04S 2400/01* (2013.01); *H04S 2400/11* (2013.01)

(58) Field of Classification Search
CPC ... G10L 19/008; H04L 67/10; H04S 2400/01; H04S 2400/11; H04S 3/008; H04S 7/303
USPC .................................................. 381/22, 300
See application file for complete search history.

(56) References Cited

U.S. PATENT DOCUMENTS

| 10,262,462 | B2 | 4/2019 | Miller et al. |
| 2009/0204413 | A1 | 8/2009 | Sintes et al. |
| 2015/0301592 | A1 | 10/2015 | Miller |
| 2016/0234475 | A1 | 8/2016 | Courchesne et al. |

(Continued)

*Primary Examiner* — Paul Kim
*Assistant Examiner* — Friedrich Fahnert

(57) ABSTRACT

An exemplary audio processing system accesses audio stream data representative of a plurality of virtual sounds that virtually originate within an extended reality world and include real-time captured speech originating from a speaking user experiencing the extended reality world and a prerecorded or synthesized sound originating from a real audio source. The audio processing system also accesses acoustic propagation data representative of characteristics that affect propagation within the extended reality world of the virtual sounds to a listening avatar. As the virtual sounds propagate to the listening avatar, the audio processing system renders, based on the audio stream data and the acoustic propagation data, a composite binaural audio stream that represents simulated reproductions of the virtual sounds. The simulated reproductions of the virtual sounds are customized to account for the characteristics that affect the propagation of the virtual sounds to the listening avatar. Corresponding systems and methods are also disclosed.

20 Claims, 9 Drawing Sheets

(56) References Cited

U.S. PATENT DOCUMENTS

| | | |
|---|---|---|
| 2016/0300387 A1 | 10/2016 | Ziman |
| 2018/0077513 A1 | 3/2018 | Link |
| 2018/0249274 A1 | 8/2018 | Lyren et al. |
| 2018/0343534 A1 | 11/2018 | Norris et al. |
| 2019/0026936 A1 | 1/2019 | Gorur et al. |

US 10,979,842 B2

METHODS AND SYSTEMS FOR PROVIDING A COMPOSITE AUDIO STREAM FOR AN EXTENDED REALITY WORLD

RELATED APPLICATIONS

This application is a continuation application of U.S. patent application Ser. No. 16/126,289, filed Sep. 10, 2018, and entitled "Methods and Systems for Providing a Composite Audio Stream for an Extended Reality World," which is hereby incorporated by reference in its entirety.

BACKGROUND INFORMATION

Extended reality technologies (e.g., virtual reality technology, augmented reality technology, mixed reality technology, etc.) allow users to experience extended reality worlds. For example, extended reality worlds may be implemented as partially or fully simulated realities that do not exist in the real world as such, or that do exist in the real world but are difficult, inconvenient, expensive, or otherwise problematic for users to experience in real life (i.e., in a non-simulated manner). Extended reality technologies may thus provide users with a variety of entertainment experiences, educational experiences, vocational experiences, and/or other enjoyable or valuable experiences that may be difficult or inconvenient for the users to experience otherwise.

In order to provide enjoyable and meaningful experiences to users, certain extended reality worlds may be relatively large and/or complex. Such extended reality worlds may provide users with a rich diversity of content to visually and audibly experience and explore. For instance, certain extended reality worlds may include a complex soundscape of sounds from a variety of virtual audio sources in the extended reality world. Conventionally, sounds included in such complex soundscapes have been mixed and layered together without regard for where the sounds virtually originate or how the sounds virtually propagate through the extended reality world. Such conventional mixing may be insufficient, however, to produce a convincing and realistic reproduction of how sound propagates and is perceived in the real world. As such, audio presented in relation to conventional extended reality worlds may, unfortunately, tend to remove and/or distract users from the immersive experience that extended reality technology is intended to provide.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
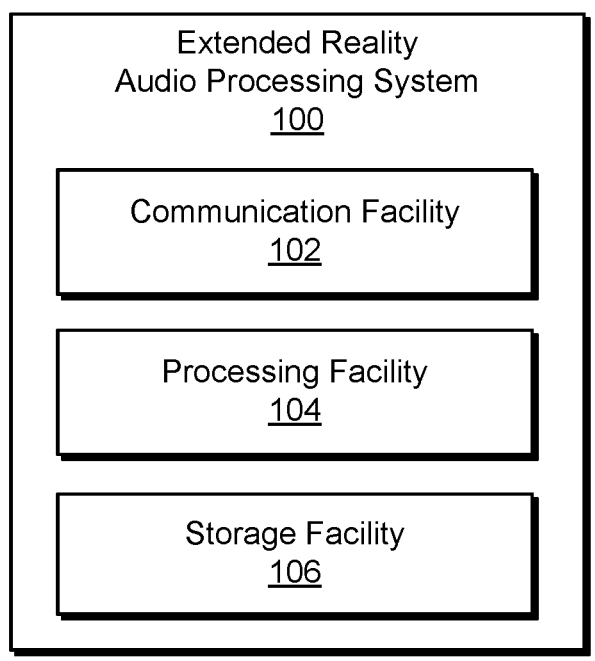
FIG. 1 illustrates an exemplary extended reality audio processing system for providing a composite audio stream for an extended reality world according to principles described herein.

Methods and systems for providing a composite audio stream for an extended reality world are described herein. Specifically, as will be described in more detail below, exemplary extended reality audio processing systems described herein may provide immersive audio for users experiencing extended reality worlds, including extended reality worlds that have complex soundscapes. For example, systems and methods described herein may provide a binaural audio stream that represents various sounds that concurrently originate from various disparate virtual audio sources within an extended reality world. In this binaural audio stream, sounds may be perceived to have propagated through the extended reality world in a similar manner as real sounds propagate in the real world. For instance, the binaural audio stream may account for various characteristics that affect propagation of sound to an avatar such as the pose (i.e., location and orientation) of each virtual audio source, the pose of the avatar of the user (e.g., including which direction the avatar's head is facing), reverberations in the extended reality world (e.g., based on sound occluding objects, the virtual materials from which they are constructed, etc.), and so forth.

To perform these and other functions described herein, an exemplary extended reality audio processing system may access a first audio stream and a second audio stream. The first audio stream, for instance, may be representative of a first virtual sound that virtually originates from a first virtual audio source within an extended reality world being experienced by a user by way of a media player device. Similarly, the second audio stream may be representative of a second virtual sound that virtually originates from a second virtual audio source (e.g., a virtual audio source distinct from the first virtual audio source) within the extended reality world. As the first and second virtual sounds propagate to an avatar of the user within the extended reality world, the extended reality audio processing system may further access real-time acoustic propagation data representative of characteristics that affect the propagation of the first and second virtual sounds to the avatar of the user. As the first and second virtual sounds propagate to the avatar of the user, the extended reality audio processing system may render a composite audio stream based on the first and second audio streams and the real-time acoustic propagation data. The composite audio stream may be a composite binaural audio stream (e.g., a stereo audio stream) representative of a composite virtual sound that comprises a combination of simulated reproductions of the first and second virtual sounds. The simulated reproductions, for instance, may be customized to account for the characteristics that affect the propagation of the first and second virtual sounds to the avatar of the user. The extended reality audio processing system may also transmit the composite binaural audio stream to the media player device for presentation to the user as the user experiences the extended reality world.

In some examples, the accessing of the audio streams and acoustic propagation data, as well as the rendering and transmitting of the composite binaural audio stream, may all be performed concurrently and in real time as the user experiences the extended reality world. As will be described in more detail below, some or all of the operations described above may be offloaded from the media player device to an implementation of the extended reality audio processing system configured to perform an arbitrary amount and intensity of computing with a very low latency to the media player device (e.g., by being implemented on a network-edge-deployed server or the like). As such, the extended reality audio processing system may provide a highly immersive and accurate audio simulation of what the user would hear if he or she were actually located in the extended reality world with the pose of his or her avatar, and may do so without any noticeable delay or latency.

Extended reality audio processing systems and methods described herein may also provide various other benefits. For example, the composite binaural audio streams provided by the systems described herein may make an extended reality world more sonically immersive and enjoyable. Rather than reproducing sound from disparate audio sources in a simple, layered mix (where different sounds may be difficult to distinguish or make sense of), composite binaural audio streams described herein provide combinations of sounds that account for various characteristics affecting propagation of the sounds within the extended reality world. For example, combinations of sounds are reproduced so as to simulate the 3D geometry of the extended reality world and the poses of the virtual audio sources within it, as well as to simulate various aspects of how sound would propagate in the extended reality world if it were the real, physical world (e.g., accounting for objects that occlude sound, form different types of reverberations zones, etc.).

In this way, users experiencing the extended reality world with such immersive audio streams may be able to better distinguish speech and otherwise make sense of sound using natural hearing cues and localization strategies such as those involving interaural level differences, interaural time differences, and so forth. This may assist the users in more easily navigating and operating within the extended reality world, thereby making their experiences within the world more enjoyable and meaningful.

Another benefit provided by the systems and methods described herein relates to the scalability of providing composite audio streams for extended reality worlds in accordance with these systems and methods. Because operations may be performed with very low latency at network-edge-deployed servers (e.g., Mobile Edge Computing or Multi-access Edge Computing ("MEC") servers, etc.), systems deployed in such servers may provide the immersive and high-quality audio streams described herein for virtually any number of audio sources by scaling the processing resources available at the network-edge-deployed server and without requiring additional resource usage at the media player device of the user. Because of this, users do not need to upgrade to the latest mobile device technologies to be able to enjoy an authentic sonic experience within an extended reality world. To the contrary, an extended reality world with an arbitrary number of virtual audio sources and an arbitrarily complex sound propagation model may be fully enjoyed by users with minimal latency provided by network-edge-deployed servers.

Moreover, by offloading the burden of processing individual audio sources from the media player device to an extended reality audio processing system implemented by a network-edge-deployed server, media player device computing resources may be conserved for other uses. For example, because a composite binaural audio stream provided by the extended reality audio processing system may require minimal resources for the media player device to decode and present to the user, the resources of the media player device may be conserved for providing higher quality video rendering or other such operations that may further enhance the immersiveness of the extended reality world and the authenticity of the extended reality experience.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary extended reality audio processing system 100 ("system 100") for providing a composite audio stream for an extended reality world. As shown, system 100 may include, without limitation, a communication facility 102, a processing facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices (e.g., multiple servers including network-edge-deployed servers) and/or multiple locations as may serve a particular implementation. Additionally, one or more of facilities 102 through 106 may be omitted from system 100 in certain implementations, while additional facilities may be included within system 100 in the same or other implementations.

In some examples, facilities 102 through 106 may be configured to operate in real time so as to access and process audio data and/or acoustic propagation data as quickly as the data is generated, and to provide a rendered composite audio stream based on the audio data and propagation data within milliseconds of its creation. As used herein, operations may be performed in "real time" when they are performed immediately and without undue delay. In some examples, real-time data processing operations may be performed in relation to data that is highly dynamic and time sensitive (i.e., data that becomes irrelevant after a very short time) such as data representative of poses of the avatar of the user within the extended reality world (e.g., where the avatar is located, which direction the avatar's head is turned, etc.), poses of virtual audio sources and other objects (e.g., sound-occluding objects) within the extended reality world, and the like. As such, real-time operations may provide a composite audio stream for an extended reality world while the data upon which the composite audio stream is based is still relevant.

The amount of time that data such as acoustic propagation data remains relevant may be determined based on an analysis of psychoacoustic considerations that may be determined in relation to users as a particular implementation is being designed For instance, in some examples, it may be determined that audio that is responsive to user actions (e.g., head movements, etc.) within approximately 20-50 milliseconds ("ms") may not be noticed or perceived by most users as a delay or a lag, while longer periods of latency such as a lag of greater than 100 ms may be distracting and disruptive to the immersiveness of a scene. As such, in these examples, real-time operations may be those performed within milliseconds (e.g., within about 20-50 ms, within about 100 ms, etc.) so as to dynamically provide an immersive, up-to-date audio stream to the user that accounts for changes occurring in the characteristics that affect the propagation of virtual sounds to the avatar (e.g., including the head movements of the user, etc.).

Each of facilities 102 through 106 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. Each of facilities 102 through 106 will now be described in more detail.

Communication facility 102 may be configured to perform various operations associated with requesting, accessing, or otherwise receiving input data for processing by system 100. For example, communication facility 102 may be configured to access a first audio stream representative of a first virtual sound that virtually originates from a first virtual audio source within an extended reality world being experienced by a user by way of a media player device, and to access a second audio stream representative of a second virtual sound that virtually originates from a second virtual audio source within the extended reality world. The second virtual audio source may be distinct from the first virtual audio source. For example, the virtual audio sources may be distinct avatars of different users experiencing the extended reality world with the user at the same time, distinct diegetic media sources (i.e., virtual loudspeakers within the extended reality world playing music or an audio track associated with a video being presented or the like), distinct non-player characters or intelligent assistants located within the extended reality world, or a distinct combination of any two instances of these or any other virtual audio sources as may serve a particular implementation.

Communication facility 102 may further be configured to access real-time acoustic propagation data as the first and second virtual sounds propagate to an avatar of the user within the extended reality world. For example, as will be described in more detail below, the real-time acoustic propagation data may be representative of characteristics that affect the propagation of the first and second virtual sounds to the avatar of the user. These may include characteristics such as where the user's avatar is positioned within the extended reality world and the orientation of the avatar's head (collectively referred to as a "pose" of the user's avatar); where virtual audio sources are positioned and/or which direction the virtual audio sources are directing virtual sounds (collectively referred to as the respective "poses" of the virtual audio sources); the geometries and/or materials of objects in the extended reality world that cause virtual sounds to echo, reverberate, be occluded, etc.; and any other such characteristics as may serve to affect propagation of virtual sound in a particular implementation. As will be described in more detail below, communication facility 102 may receive this real-time acoustic propagation data from any suitable source such as from a media player device used by the user to experience the extended reality world, a world management server (e.g., a game server) that manages data for multiple users in a multi-user extended reality world, a live capture management system for an extended reality world generated based on live capture of a real-world scene, or any other system as may serve a particular implementation.

As processing facility 104 processes the audio streams and/or real-time acoustic propagation data to render a composite audio stream (e.g., a composite binaural audio stream) as will be described below, communication facility 102 may further be configured to output the composite audio stream. For example, communication facility 102 may transmit the composite audio stream to the media player device for presentation to the user as the user experiences the extended reality world.

Processing facility 104 may be configured to receive and process data accessed by (i.e., input by way of, received by, etc.) communication facility 102 in any suitable manner. For example, as will be described in more detail below, processing facility 104 may be configured to perform various operations to generate the composite audio stream to be transmitted to the media player device. Processing facility 104 may, for instance, render a composite binaural audio stream based on the first and second audio streams and the real-time acoustic propagation data as the first and second virtual sounds propagate to the avatar of the user. The composite binaural audio stream may be representative of a composite virtual sound that comprises a combination of simulated reproductions of the first and second virtual sounds. For example, the simulated reproductions may be customized to account for the characteristics that affect the propagation of the first and second virtual sounds to the avatar of the user (i.e., the characteristics represented by the real-time acoustic propagation data).

Storage facility 106 may maintain any suitable data received, generated, managed, analyzed, processed, used, and/or transmitted by facilities 102 and/or 104 in a particular implementation. For example, storage facility 106 may store or temporarily buffer audio signals (e.g., the first and/or second audio streams, composite audio streams, etc.), real-time acoustic propagation data, and/or any other data received, generated, managed, maintained, used, and/or transmitted by facilities 102 and/or 104. Additionally, storage facility 106 may include program instructions and/or other data used by facilities 102 and/or 104 in performing the operations described herein.

Figure 2:
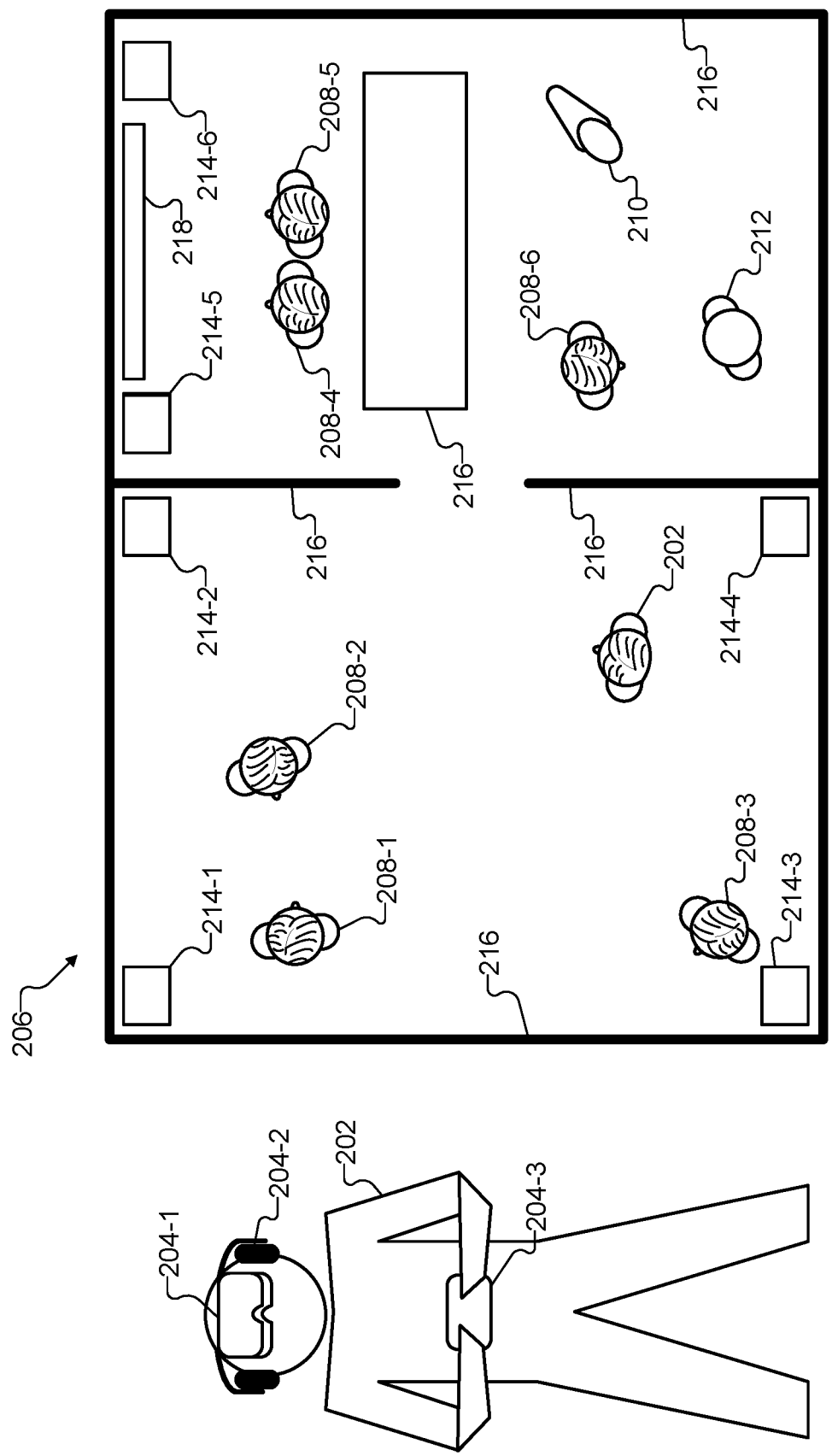
FIG. 2A illustrates an exemplary user experiencing an extended reality world according to principles described herein.
FIG. 2B illustrates an exemplary extended reality world being experienced by the user of FIG. 2A according to principles described herein.

FIG. 2A illustrates an exemplary user 202 experiencing an extended reality world according to principles described herein. As used herein, an extended reality world may refer to any world that may be presented to a user and that includes one or more immersive, virtual elements (i.e., elements that are made to appear to be in the world perceived by the user even though they are not physically part of the real-world environment in which the user is actually located). For example, an extended reality world may be a virtual reality world in which the entire real-world environment in which the user is located is replaced by a virtual world (e.g., a computer-generated virtual world, a virtual world based on a real-world scene that has been captured or is presently being captured with video footage from real world video cameras, or the like). As another example, an extended reality world may be an augmented or mixed reality world in which certain elements of the real-world environment in which the user is located remain in place while virtual elements are imposed onto the real-world environment. In still other examples, extended reality worlds may refer to immersive worlds at any point on a continuum of virtuality that extends from completely real to completely virtual.

In order to experience the extended reality world, FIG. 2A shows that user 202 may use a media player device that includes various components such as a video headset 204-1, an audio headset 204-2, a controller 204-3, and/or any other components as may serve a particular implementation (not explicitly shown). The media player device including components 204-1 through 204-3 will be referred to herein as media player device 204, and it will be understood that media player device 204 may take any form as may serve a particular implementation. For instance, in certain examples, media player device 204 may be integrated into one unit that is worn on the head and that presents video to the eyes of user 202, presents audio to the ears of user 202, and allows for control by user 202 by detecting how user 202 moves his or her head and so forth. In other examples, video may be presented on a handheld device rather than a head-worn device such as video headset 204-1, audio may be presented by way of a system of loudspeakers not limited to the ear-worn headphones of audio headset 204-2, user control may be detected by way of gestures of user 202 or other suitable methods, and/or other variations may be made to the illustrated example of media player device 204 as may serve a particular implementation.

FIG. 2B illustrates an exemplary extended reality world 206 ("world 206") that may be experienced by user 202 using media player device 204. World 206 includes a variety of different types of virtual audio sources that will now be described, thereby giving world 206 a somewhat complex soundscape for illustrative purposes. It will be understood, however, that world 206 is exemplary only, and that other implementations of world 206 may be any size (e.g., including much larger than world 206), may include any number of virtual audio sources (e.g., including dozens or hundreds of virtual audio sources or more in certain implementations), may include any number and/or geometry of objects, and so forth.

The exemplary implementation of world 206 illustrated in FIG. 2B is shown to be a multi-user extended reality world being jointly experienced by a plurality of users including user 202 and several additional users. As such, world 206 is shown to include, from an overhead view, two rooms within which a variety of characters (e.g., avatars of users, as well as other types of characters described below) are included. Specifically, the characters shown in world 206 include a plurality of avatars 208 (i.e., avatars 208-1 through 208-6) of the additional users experiencing world 206 with user 202, a non-player character 210 (e.g., a virtual person, a virtual animal or other creature, etc. that is not associated with a user), and an embodied intelligent assistant 212 (e.g., an embodied assistant implementing APPLE's "Siri," AMAZON's "Alexa," etc.). Moreover, world 206 includes a plurality of virtual loudspeakers 214 (e.g., loudspeakers 214-1 through 214-6) that may present diegetic media content (i.e., media content that is to be perceived as originating at a particular source within world 206 rather than as originating from a non-diegetic source that is not part of world 206), and so forth.

Each of the characters may interact with one another, interact with world 206, and otherwise behave in any manner as may be appropriate in the context of world 206 and/or in any manner as the users experiencing world 206 may choose. For example, avatars 208-1 and 208-2 may be engaged in a virtual chat with one another, avatar 208-3 may be engaged in a phone call with someone who is not represented by an avatar within world 206, avatars 208-4 and 208-5 may be engaged in listening and/or discussing media content being presented within world 206, avatar 208-6 may be giving instructions or asking questions to the embodied intelligent assistant 212 (which intelligent assistant 212 may respond to), non-player character 210 may be making sound effects or the like as it moves about within world 206, and so forth. Additionally, virtual loudspeakers 214 may originate sound such as media content to be enjoyed by users experiencing the world. For instance, virtual loudspeakers 214-1 through 214-4 may present background music or the like, while virtual loudspeakers 214-5 and 214-6 may present audio content associated with a video presentation being experienced by users associated with avatars 208-4 and 208-5.

As the characters and virtual loudspeakers originate virtual sounds in these and other ways, system 100 may simulate a propagation of the virtual sounds to an avatar associated with user 202. As shown, the avatar of user 202 is labeled with a reference designator 202 and, as such, may be referred to herein as "avatar 202." It will be understood that avatar 202 may be a virtual embodiment of user 202 within world 206. Accordingly, for example, when user 202 turns his or her head in the real world (e.g., as detected by media player device 204), avatar 202 may correspondingly turn his or her head in world 206. User 202 may not actually see avatar 202 in his or her view of world 206 because the field of view of user 202 is simulated to be the field of view of avatar 202. However, even if not explicitly seen, it will be understood that avatar 202 may still be modeled in terms of characteristics that may affect sound propagation (e.g., head shadow, etc.). Additionally, in examples such as world 206 in which multiple users are experiencing the extended reality world together, other users may be able to see and interact with avatar 202, just as user 202 may be able to see and interact with avatars 208 from the vantage point of avatar 202.

Virtual sounds originating from each of characters 208 through 212 and/or virtual loudspeakers 214 may propagate through world 206 to reach the virtual ears of avatar 202 in a manner that simulates the propagation of sound in a real-world scene equivalent to world 206. For example, virtual sounds that originate from locations relatively nearby avatar 202 and/or toward which avatar 202 is facing may be reproduced such that avatar 202 may hear the sounds relatively well (e.g., because they are relatively loud, etc.). Conversely, virtual sounds that originate from locations relatively far away from avatar 202 and/or from which avatar 202 is turned away may be reproduced such that avatar 202 may hear the sounds relatively poorly (e.g., because they are relatively quiet, etc.). Additionally, as shown in FIG. 2B, various objects 216 may be simulated to reflect, occlude, or otherwise affect virtual sounds propagating through world 206 in any manner as may be modeled within a particular implementation. For example, objects 216 may include walls that create reverberation zones and/or that block or muffle virtual sounds from propagating from one room to the other in world 206. Additionally, objects 216 may include objects like furniture or the like (e.g., represented by the rectangular object 216 in world 206) that absorb, occlude, or otherwise affect the propagation of virtual sounds within world 206.

Figure 3:
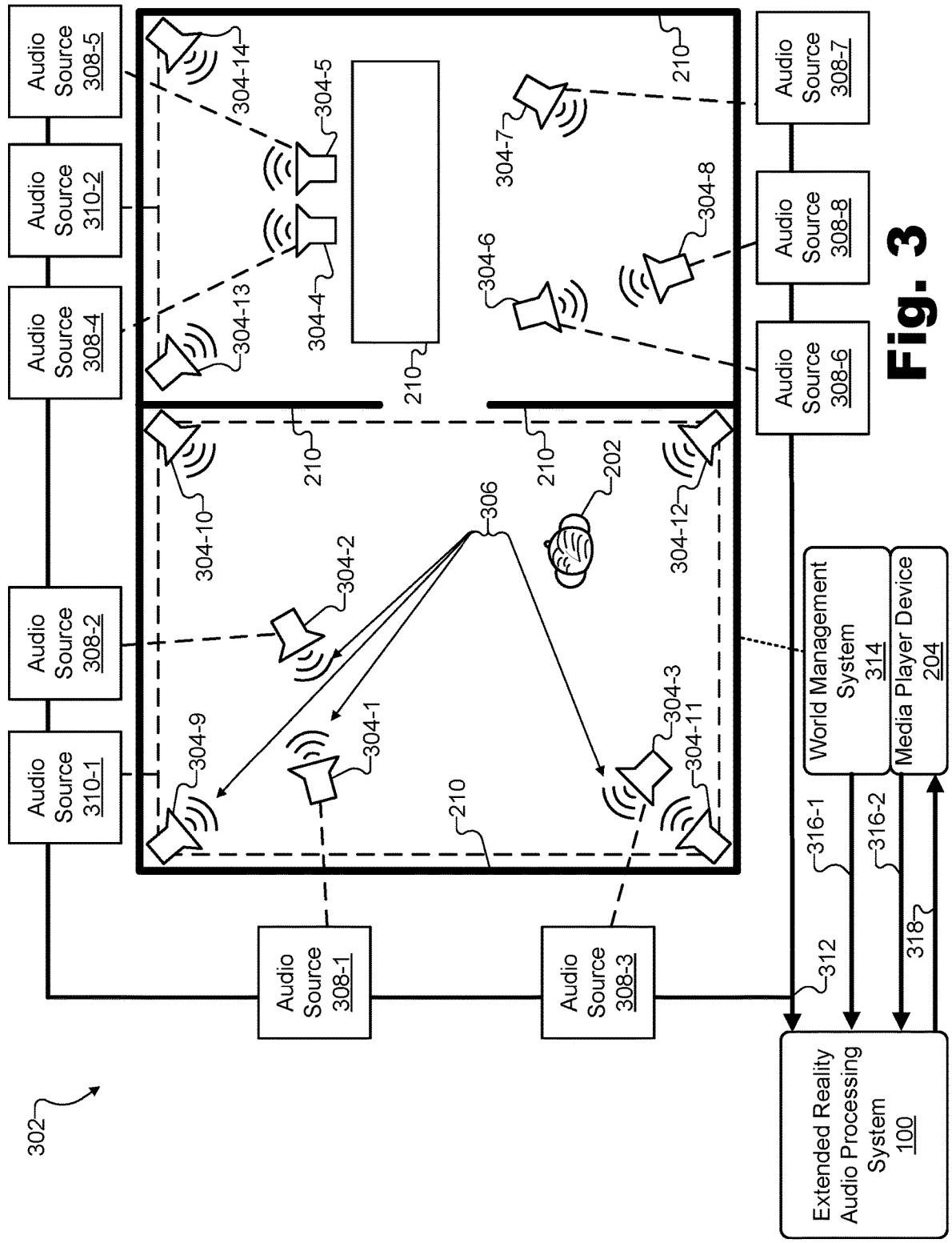
FIG. 3 illustrates an exemplary soundscape of the extended reality world of FIG. 2B according to principles described herein.

To illustrate the complex audio associated with world 206 more specifically, FIG. 3 illustrates an exemplary soundscape 302 of world 206. As shown, avatar 202 is illustrated to be located in the same place within world 206, but each of the potential sources of virtual sound within world 206 is replaced with a respective virtual audio source 304 (e.g., virtual audio sources 304-1 through 304-14). Specifically, avatars 308-1 through 308-6 are depicted in soundscape 302, respectively, as virtual audio sources 304-1 through 304-6; non-player character 210 is depicted in soundscape 302 as virtual audio source 304-7, intelligent assistant 212 is depicted in soundscape 302 as virtual audio source 304-8; and virtual loudspeakers 214-1 through 214-6 are depicted in soundscape 302, respectively, as virtual audio sources 304-9 through 304-14. It will be understood that all of virtual audio sources 304 may not be originating virtual sound all the time. For example, virtual audio sources 304-1 and 304-2 may alternately originate virtual sounds as the users associated with avatars 208-1 and 208-2 chat, virtual audio sources 304-4 and 304-5 may be mostly quiet (i.e., not originating any virtual sound) as the users associated with avatars 208-4 and 208-5 silently enjoy the video presentation, and so forth. In some examples, between all of the potential virtual audio sources 304 included within soundscape 302, a significant amount of sound may propagate around soundscape 302 at any given moment, all of which system 100 may provide to user 202 to at least some degree.

For example, while avatars 208-4 and 208-5 may be watching a video presentation presented on a virtual screen 218 that is associated with audio virtually originating from virtual loudspeakers 214-5 and 214-6, the virtual sound originating for this video presentation may be easily perceivable by users associated with avatars 208-4 and 208-5 (i.e., since they are relatively nearby and not occluded from virtual loudspeakers 214-5 and 214-6) while being difficult to perceive by user 202 (i.e., due to the relative distance of avatar 202 from virtual loudspeakers 214-5 and 214-6, occlusion from objects 216 such as the walls between the rooms and the furniture object, etc.). In contrast, music presented over virtual loudspeakers 214-1 through 214-4 in the room in which avatar 202 is located may be easily perceivable by user 202 and users associated with avatars 208-1 through 208-3, while being less perceivable (e.g., but perhaps not completely silent) for users associated with avatars located in the other room (i.e., avatars 208-4 through 208-6).

As shown by respective dashed lines in soundscape 302, each of virtual audio sources 304 may be associated with an audio source that generates or originates the real sound upon which the virtual sounds originating from the virtual audio sources are based. For example, as shown, each of virtual audio sources 304-1 through 304-8 associated with different users or other characters may correspond to different respective audio sources 308 (e.g., audio sources 308-1 through 308-8). Similarly, groups of related virtual audio sources such as virtual audio sources 304-9 through 304-12 (which may be associated with virtual loudspeakers 214 that are all configured to present the same content) or virtual audio sources 304-13 and 304-14 (which may be associated with virtual loudspeakers 214 that are both configured to present content associated with the video presentation shown on virtual screen 218) may correspond to different respective audio sources 310 (i.e., audio sources 310-1 and 310-2). Specifically, audio source 310-1 is shown to correspond to the group of virtual audio sources including virtual audio sources 304-9 through 304-12 while audio source 310-2 is shown to correspond to the group of virtual audio sources including virtual audio sources 304-13 and 304-14. Additionally, respective virtual sounds 306 are shown to originate from each of virtual audio sources 304. It will be understood that virtual sounds 306 may propagate through world 206 (i.e., through soundscape 302) to reach user 202 in any of the ways described herein.

Each of audio sources 308 and 310 may be separate and distinct audio sources. For example, audio source 308-1 may be a real-world microphone capturing speech from a user associated with avatar 208-1, and a virtual sound 306 originating from virtual audio source 304-1 may be based on a real-time microphone-captured sound originating from the user associated with avatar 208-1 as the user experiences the multi-user extended reality world. Similarly, audio source 308-2 may be a different real-world microphone capturing speech from a user associated with avatar 208-2 (who may be in a different real-world location than the user associated with avatar 208-1), and a virtual sound 306 originating from virtual audio source 304-2 may be based on a real-time microphone-captured sound originating from this user as he or she experiences the multi-user extended reality world and, in the example shown, chats with the user associated with avatar 208-1.

Other virtual sounds 306 associated with other virtual audio sources 304 may similarly come from microphones associated with respective users, or may come from other real-world sources. For instance, audio source 308-3 may include a telephonic system that provides telephonic speech data as the user associated with avatar 208-3 engages in a telephone conversation, audio source 308-7 may include a storage facility (e.g., a hard drive or memory associated with a media player device or world management system) that stores prerecorded sound effects or speech that are to originate from non-player character 210, recorded audio source 308-8 may include a speech synthesis system that generates speech and other sounds associated with intelligent assistant 212, and so forth for any other live-captured, prerecorded, or synthesized audio sources as may serve a particular implementation.

As shown, audio sources 310 may each be associated with a plurality of related virtual audio sources 304. Specifically, as illustrated by dashed lines connecting each of virtual audio sources 304-9 through 304-12, a sound generated by audio source 310-1 may correspond to virtual sounds generated by each of virtual audio sources 304-9 through 304-12. For example, audio source 310-1 may be a music playback system, an audio content provider system (e.g., associated with an online music service, a radio station, etc.), or any other device capable of originating prerecorded or synthesized audio (e.g., music, announcements, narration, etc.) that may be presented in world 206. Similarly, as illustrated by dashed lines connecting both of virtual audio sources 304-13 and 304-14, a sound generated by audio source 310-1 may correspond to virtual sounds generated by both virtual audio sources 304-13 and 304-14. For example, audio source 310-1 may be a video playback system, a video content provider system (e.g., associated with an online video service, a television station, etc.), or any other device capable of originating prerecorded or synthesized audio (e.g., standard video content, 360° video content, etc.) that may be presented in world 206.

Along with speech, media content, and so forth, virtual sounds 306 originating from one or more of virtual audio sources 304 may also include other sound configure to further add to the realism and immersiveness of world 206. For example, virtual sounds 306 may include ambient and/or environmental noise, sound effects (e.g., Foley sounds, etc.).

FIG. 3 illustrates that system 100 receives audio stream data 312 from each of audio sources 308 and 310. Audio stream data 312 is shown to represent audio streams that may be accessed by system 100 from each of the disparate audio sources 308 and 310. While audio stream data 312 is illustrated as a single line connecting all of audio sources 308 and 310, it will be understood that each audio source 308 and 310 may be configured to communicate independently with system 100 (e.g., with a dedicated communication path rather than being daisy chained together as is depicted for illustrative convenience) and may communicate directly or by way of one or more networks (not explicitly shown).

Additionally, FIG. 3 shows a world management system 314 that is associated with soundscape 302 (as shown by the dotted line connecting world management system 314 and soundscape 302). As will be described in more detail below, world management system 314 may be integrated with media player device 204 in certain examples (e.g., certain examples involving a single-user extended reality world) or by a system separate and distinct from media player device 204 in other examples (e.g., certain examples involving a multi-user extended reality world or an extended reality world based on a live-captured real-world scene). Regardless of the manner of implementation, both world management system 314 and media player device 204 may provide real-time acoustic propagation data 316-1 and 316-2 (collectively referred to herein as real-time acoustic propagation data 316) to system 100 to allow system 100 to perform any of the operations described herein to facilitate rendering a composite binaural audio stream 318 to be provided back to media player device 204. As will be described in more detail below, acoustic propagation data 316 may consist of at least two different types of acoustic propagation data referred to herein as world propagation data 316-1 and listener propagation data 316-2.

Figure 4:
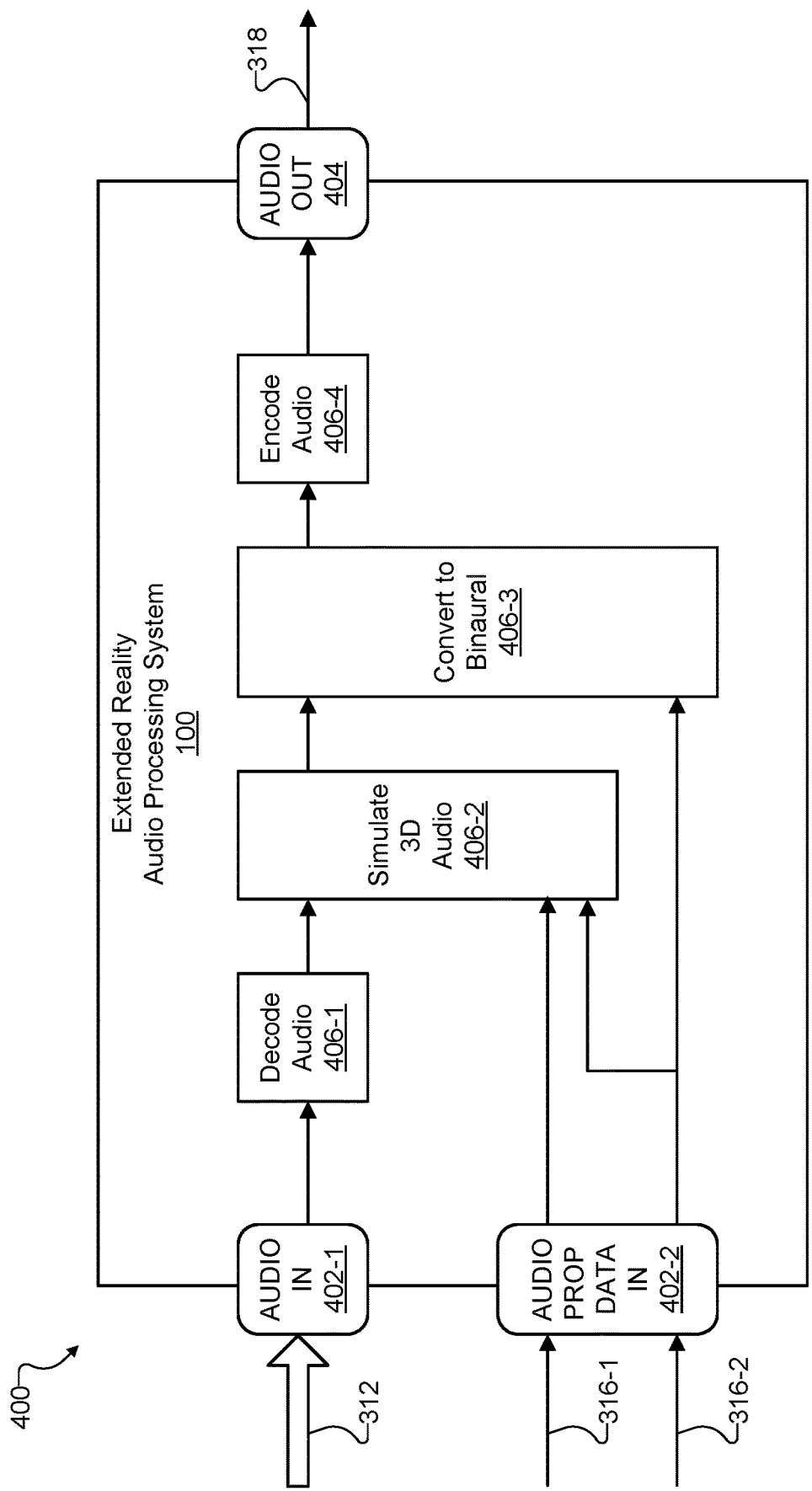
FIG. 4 illustrates an exemplary implementation of the extended reality audio processing system of FIG. 1 according to principles described herein.

FIG. 4 depicts an exemplary implementation 400 of system 100 that may be configured to access (e.g., input) audio stream data 312 and real-time acoustic propagation data 316, as well as to transmit composite binaural audio stream 318. In implementation 400 of system 100, communication facility 102 may be implemented by input interfaces 402 including an "AUDIO IN" interface 402-1 and an "AUDIO PROPAGATION DATA IN" interface 402-2, as well as by an "AUDIO OUT" output interface 404. Interfaces 402 and 404 may be standard interfaces for communicating data (e.g., directly or by way of wired or wireless networks or the like). In this implementation, processing facility 104 may be implemented by various processing blocks 406 including a decode audio block 406-1, a simulate 3D audio block 406-2, a convert to binaural block 406-3, an encode audio block 406-4, and/or any other processing blocks (not explicitly shown) as may serve a particular implementation. It will be understood that each processing block 406 may be implemented by any combination of hardware and/or software computing resources as may serve implementation 400. The data flow and processing performed by implementation 400 to render composite binaural audio stream 318 based on data 312 and 316 will now be described in more detail.

As was shown and described above in relation to FIG. 3, audio stream data 312 may include audio data from a plurality of audio sources 308. As such, audio stream data 312 may include a plurality of separate and distinct audio streams originating from different locations and being generated in different ways. For example, as described above, certain audio streams included within audio stream data 312 may be captured live by microphones used by users located in different places (e.g., in different parts of the country or the world) such as by headset microphones used to enable chat features during a shared extended reality experience. Other audio streams included within audio stream data 312 may be accessed from a storage facility (e.g., loaded from disc after being prerecorded and stored there), synthesized in real time, streamed from a media service (e.g., a music or video streaming service), or accessed in any other suitable manner from any other suitable audio source. Due to the diversity of different possible audio streams that may be included within audio stream data 312, it will be understood that different audio streams may be encoded in different ways and/or using different encodings, technologies, and/or formats such as MP3, AAC, Vorbis, FLAC, Opus, and/or any other such technologies or encoding formats. For example, certain audio streams may use open source encoding technologies while others may employ proprietary formats.

Real-time acoustic propagation data 316 may include any data that is descriptive or indicative of how virtual sound propagates within world 206 in any way. In particular, world propagation data 316-1 may describe various aspects of world 206 and the virtual objects within world 206 that affect how sound propagates from a virtual audio source to avatar 202, while listener propagation data 316-2 may describe various real-time conditions associated with avatar 202 itself that affect how such virtual sounds are received. For this reason, world propagation data 316-1 is shown in FIG. 3 to originate from world management system 314, while listener propagation data 316-2 is shown to originate from media player device 204. As will be described in more detail below, world management system 314 may include a system that manages various aspects of world 206 and that may or may not be integrated with media player device 204, and media player device 204 may dynamically detect and track the pose of user 202 so as to thus be the most definitive source of data related to how user 202 is turning his or her head or otherwise posing his or her body to control avatar 202.

World propagation data 316-1 may include data describing occluding objects within world 206 such as any of occluding objects 216 illustrated in FIG. 2B. For example, world propagation data 316-1 may describe a number of objects included in world 216, a position of each object, an orientation of each object, dimensions (e.g., a size) of each object, a shape of each object, virtual materials from which each object is virtually constructed (e.g., whether of relatively hard materials that tend to reflect virtual sound, relatively soft materials that tend to absorb virtual sound, etc.), or any other properties that may affect how occluding objects could affect the propagation of virtual sounds in world 206. Because, as mentioned above, certain occluding objects may be walls in world 206 that are blocking, reflecting, and/or absorbing sound, it follows that world propagation data 316-1 may further include environmental data representative of a layout of various rooms within world 206, reverberation zones formed by walls within world 206, and so forth. Additionally, world propagation data 316-1 may include data representative of a virtual speed of sound to be modeled for world 206, which may correspond, for instance, with a virtual ambient temperature in world 206.

Just as world propagation data 316-1 may dynamically describe a variety of propagation effects that occluding objects included within world 206 may have in real time, world propagation data 316-1 may further dynamically describe propagation effects of a variety of virtual audio sources from which virtual sounds heard by avatar 202 may originate. For example, world propagation data 316-1 may include real-time information about poses, sizes, shapes, materials, and environmental considerations of one or more virtual audio sources included in world 206 (e.g., each of virtual audio sources 304). Thus, for example, if a virtual audio source 304 implemented as an avatar of another user turns to face avatar 202 directly or moves closer to avatar 202, world propagation data 316-1 may include data describing this change in pose that may be used to make the audio more prominent (e.g., louder, more pronounced, etc.) in the rendered composite audio stream. In contrast, world propagation data 316-1 may similarly include data describing a pose change of the virtual audio source 304 when turning to face away from avatar 202 and/or moving farther from avatar 202, and this data may be used to make the audio less prominent (e.g., quieter, fainter, etc.) in the rendered composite audio stream.

As mentioned above, listener propagation data 316-2 may describe real-time pose changes of avatar 202 itself. In other words, for example, listener propagation data 316-2 may describe movements (e.g., head turn movements, point-to-point walking movements, etc.) performed by user 202 that cause avatar 202 to change pose within world 206. When user 202 turns his or her head, for example, the interaural time differences, interaural level differences, and others cues that may assist user 202 in localizing sounds within world 206 may need to be recalculated and adjusted in the audio being provided to user 202 in order to properly model how virtual sound arrives at the virtual ears of avatar 202. Listener propagation data 316-2 thus tracks these types of variables and provides them to system 100 so that head turns and other movements of user 202 may be accounted for in real time in the ways described herein.

Acoustic propagation data 316-1 and 316-2 may both be transmitted and received in any suitable way and/or using any communication technology as may serve a particular implementation. For example, acoustic propagation data 316 may be communicated using user datagram protocol ("UDP"), real-time transport protocol ("RTTP"), or another such technology or protocol.

While, as mentioned above, a network-edge-deployed server used to implement system 100 can more conveniently and realistically be configured with an arbitrary amount of computing power than can a media player device belonging to the user, it will be understood that any computing device upon which system 100 is implemented is still limited to certain finite processing capabilities. As such, propagation within world 206 may be modeled to an arbitrary degree of accuracy, but may not be modeled to an infinite degree of accuracy. As such, to account for whatever computing limitations implementation 400 may happen to have, acoustic propagation data 316 may be configured, in certain examples, to prioritize "crucial" acoustic propagation data over other less important acoustic propagation data. In this way, system 100 may always be expected to create a most immersive composite binaural audio stream possible given the current complexity of soundscape 302 and available resources of system 100. Such prioritization of crucial acoustic propagation data over other less important acoustic propagation data may be included in a process referred to as "triage rendering," and may be configured to leverage psychoacoustic principles that dictate what elements of the final render of composite binaural audio stream 318 must be performed to preserve perceived immersion, physical coherence, and a perception that audio generation is occurring in real-time.

Once data 312 and 316 have been received or otherwise accessed by input interfaces 402, processing blocks 406 may operate on this data to generate composite binaural audio stream 318 to be output by output interface 404. Specifically, decode audio block 406-1 may first convert all of the different audio streams included within audio stream data 312 to a common, "raw" type of audio format that will allow all audio to be processed together in a similar manner. More specifically, decode audio block 406-1 may include decoders for each different encoding technology or format with which the audio streams included within audio stream data 312 are encoded, and may employ these decoders to convert each of the audio streams to a common format such as pulse-code modulated ("PCM") audio or the like. As used herein, an audio stream that has been decoded and converted to a common format in this way may be referred to as a "raw audio stream."

As shown in FIG. 4, simulate 3D audio block 406-2 may be configured to take in all the raw audio streams decoded by decode audio block 406-1, as well as the world propagation data 316-1 received by input interface 402-2. Based on these raw audio streams and this acoustic propagation data, simulate 3D audio block 406-2 may be configured to generate a 3D audio representation of all the virtual sounds represented within the audio streams. Specifically, simulate 3D audio block 406-2 may generate the 3D audio representation to be customized to account for the characteristics that affect the propagation of the virtual sounds to avatar 202 (i.e., as those characteristics are described in world propagation data 316-1). Simulate 3D audio block 406-2 may generate this 3D audio representation in any manner and using any 3D surround sound technologies or formats as may serve a particular implementation. For example, the 3D audio representation may be simulated using an AMBISONIC full-sphere surround sound technology, a 5.1 surround sound technology, a 7.1 surround sound technology, or any other surround sound technology as may serve a particular implementation.

As shown, the 3D audio representation generated by simulate 3D audio block 406-2 may take into account all of world propagation data 316-1 (i.e., all the data indicative of virtual audio source poses and occluding objects within world 206) as well as certain listener propagation data 316-2 such as the real-time location of avatar 202 within world 206 with respect to each of these virtual audio sources and occluding objects. Accordingly, the 3D audio representation generated by simulate 3D audio block 406-2 may represent 3D audio with respect to the position of avatar 202 within world 206 without regard for the orientation (i.e., which direction the head is turned) of avatar 202 at that position.

In some examples, it may be desirable to provide the 3D representation to a media player device that provides audio to a user using a 3D surround sound setup (e.g., with statically positioned speakers in a room). However, as illustrated in the example of media player device 304, where audio is provided by audio headset 204-2 being worn by user 202 as he or she moves and turns his or her head, it may be desirable in other examples to generate a binaural audio stream to provide to media player device 204 that will account for the dynamic orientation (e.g., head turns) of avatar 402 within audio presented by audio headset 204-2. Additionally, it also may be desirable for system 100 to convert the 3D audio representation to a binaural audio representation to be transmitted to and played back by media player device 204 for other reasons. For example, while simulate 3D audio block 406-2 may generate the 3D audio representation using an arbitrary number of channels each associated with different 3D directions from which sound may originate, the data for all of these channels may not be useful to media player device 204 if audio headset 204-2 is implemented as a binaural headset (i.e., a headset with two speakers providing sound for the two ears of user 202). As such, it would be inefficient to transmit data representative of all these channels (i.e., rather than merely data for two binaural channels) and/or for media player device 204 to perform a binaural conversion using its own limited computing resources (i.e., rather than offloading this task to the implementation of system 100 on a server such as a network-edge-deployed server).

To this end, convert to binaural block 406-3 may be configured to take in the 3D audio representation generated by simulate 3D audio block 406-2, as well as listener propagation data 316-2 representative of a dynamic orientation of avatar 202 (i.e., real-time head-turn data), and to generate a composite binaural raw audio stream representative of the 3D audio representation. The composite binaural raw audio stream may include only two channels (i.e., left and right), but may account, in real-time, for the spatial characteristics of sound orientation for avatar 202 with respect to the orientation of avatar 202. This audio stream may include "raw" audio (e.g., PCM audio) that is not yet encoded or compressed to be prepared for transmission to media player device 204.

Encode audio block 406-4 may thus take in the composite binaural raw audio stream and encode and convert this raw audio stream to generate composite binaural audio stream 318, which may be transmitted to media player device 204 for presentation to user 202 as user 202 experiences world 206. Because encode audio block 406-4 is included within system 100 (which may be implemented within a network-edge-deployed server rather than a media player device), it may be convenient and practical for encode audio block 406-4 to include several parallel encoding resources to perform the encoding quickly and efficiently.

Output interface 404 may transmit composite binaural audio stream 318 to media player device 204 in any manner and/or using any communication technologies as may serve a particular implementation. Generated and transmitted in the ways described above, it will be understood that composite binaural audio stream 318 is thus "composite" in the sense that it includes data from at least two disparate audio sources, is "binaural" in the sense that it accounts for what user 202 should hear at each ear based on available real-time acoustic propagation data, and is an "audio stream" in the sense that the audio data continues to be generated and flow as a real-time continuous stream as user 202 experiences world 206.

Implementations of system 100 such as implementation 400 may be configured for use in various configurations and use cases that will now be described. For example, certain implementations may be configured for single-user use such as for a user playing a single-player game, watching an extended reality media program such as an extended reality television show or movie, or the like. Such configurations will be described below with respect to FIG. 5. Other implementations of system 100 may be configured to be shared and experienced by multiple users. For instance, a multi-user extended reality world may be associated with a multi-player game, a multi-user chat or "hangout" environment, an emergency command center, or any other world that may be co-experienced by a plurality of users simultaneously. Such configurations will be described below with respect to FIG. 6. Still other implementations of system 100 may be configured to provide live, real-time capture of real-world events such as athletic events (e.g., professional basketball games, college football games, Olympic events, etc.), music concerts, and so forth. Such configurations will be described below with respect to FIG. 7.

Figure 6:
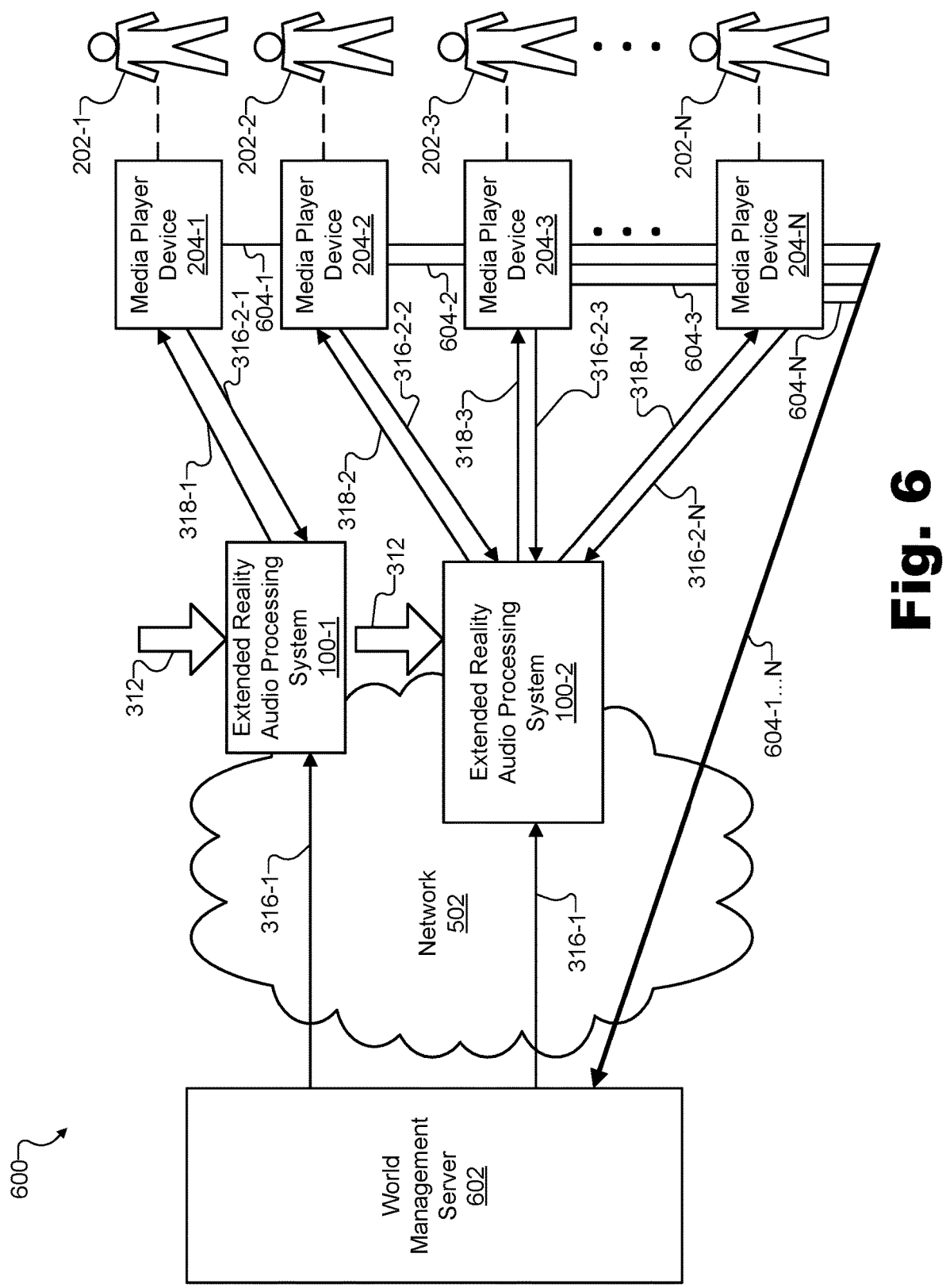
FIG. 6 illustrates an exemplary multi-user configuration in which the extended reality audio processing system of FIG. 1 operates to provide a composite audio stream for a multi-user extended reality world according to principles described herein.
Figure 7:
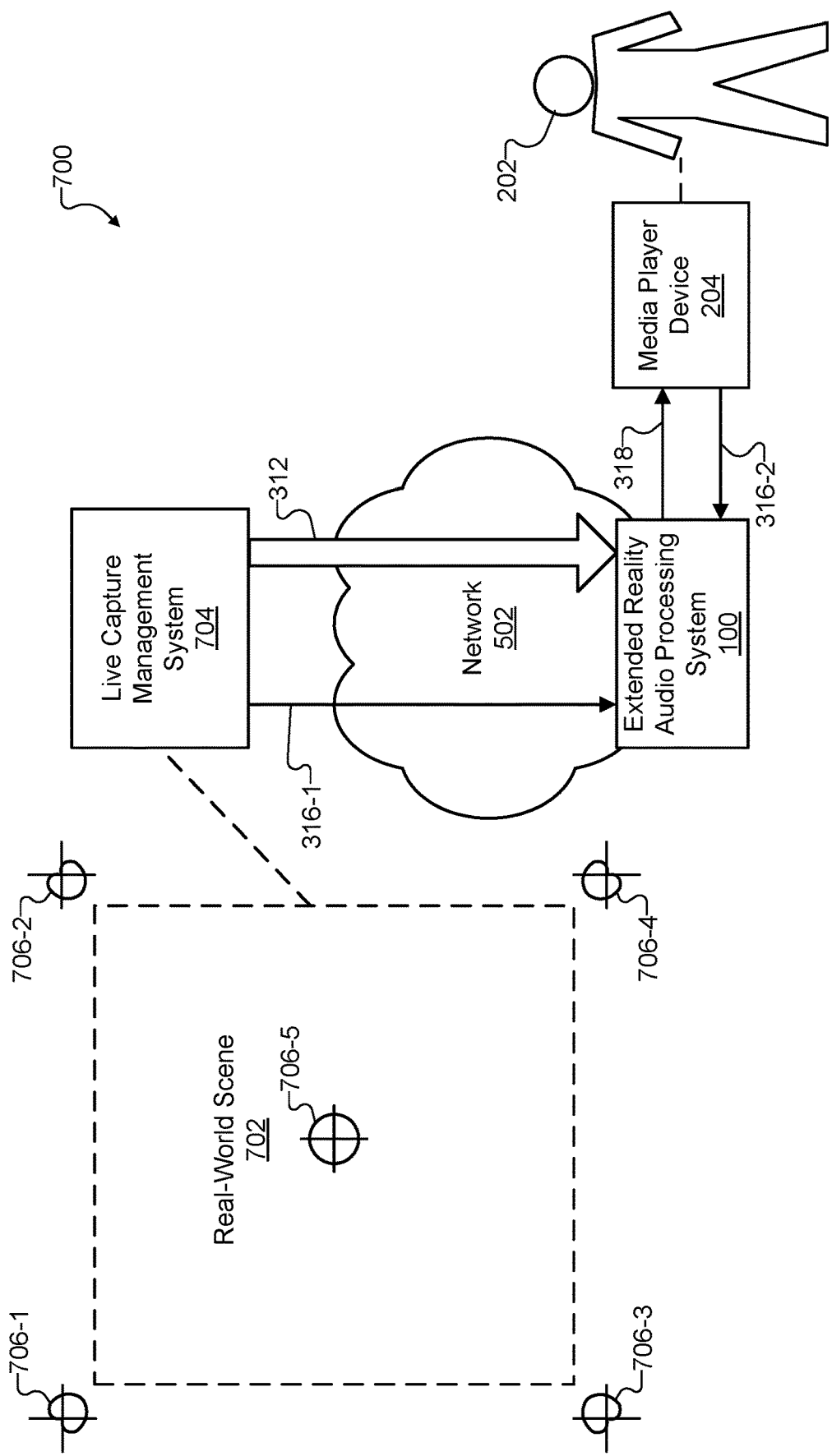
FIG. 7 illustrates an exemplary live capture configuration in which the extended reality audio processing system of FIG. 1 operates to provide a composite audio stream for an extended reality world generated based on a live capture of a real-world scene according to principles described herein.

While a few exemplary use cases are described below in detail, it will be understood that other use cases not explicitly described herein may also be served by certain implementations of system 100. For example, such use cases may involve volumetric virtual reality use cases in which real-world scenes are captured (e.g., not necessarily in real-time or for live events), virtual reality use cases involving completely virtualized (i.e., computer-generated) representations, augmented reality use cases in which certain objects are imposed over a view of the actual real-world environment within which the user is located, video game use cases involving conventional 3D video games, and so forth. Additionally, while the configurations illustrated in FIGS. 5-7 are limited in scope to illustrating how audio-related aspects of extended reality content are provided to media player devices, it will be understood that various systems and processes for providing and synchronizing corresponding video-related aspects of extended reality world content may also be in place, although these are beyond the scope of the instant disclosure.

Figure 5:
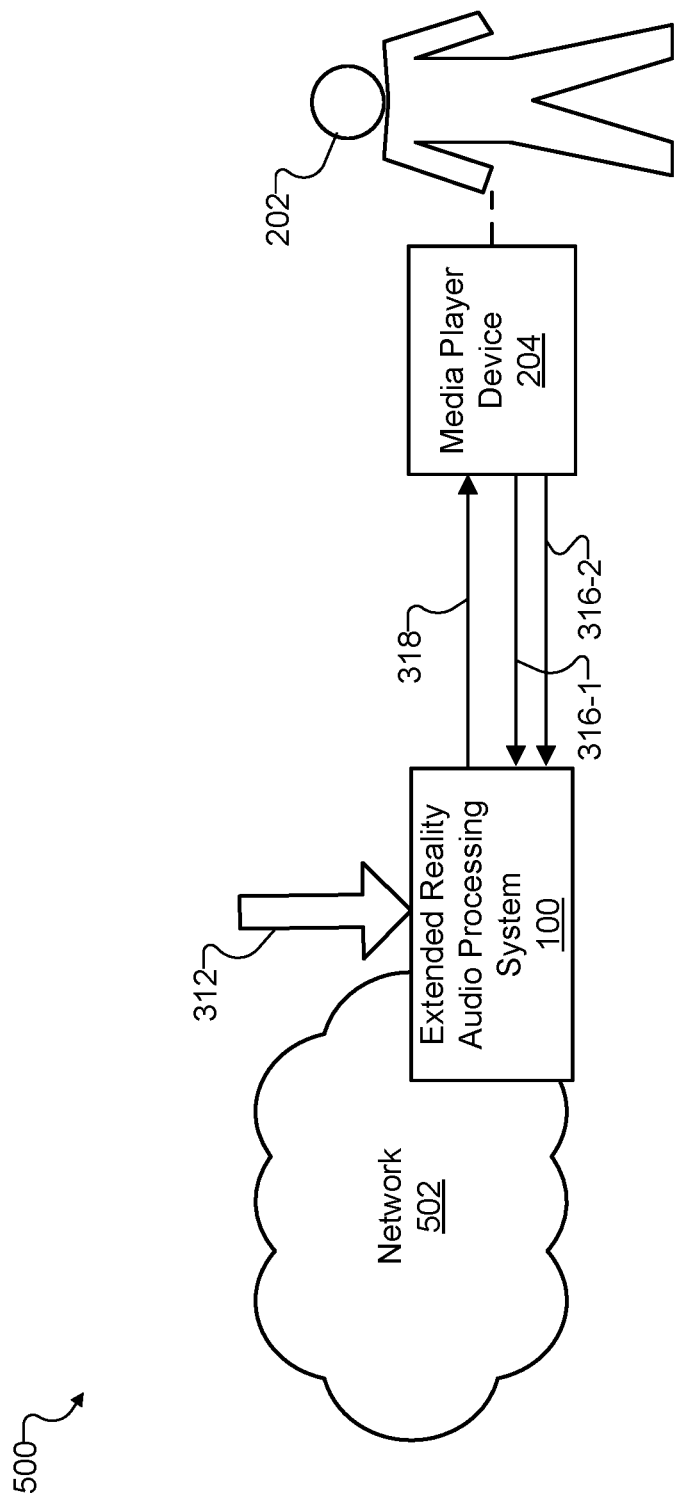
FIG. 5 illustrates an exemplary single-user configuration in which the extended reality audio processing system of FIG. 1 operates to provide a composite audio stream for a single-user extended reality world according to principles described herein.

FIG. 5 illustrates an exemplary single-user configuration 500 in which system 100 operates to provide composite binaural audio stream 318 for a single-user extended reality world. In configuration 500, the extended reality world being experienced by user 202 is a single-user extended reality world managed by media player device 204. As such, in this implementation, no separate management server (e.g., no additional game server or other world management server) is needed or used for managing world data and/or data associated with additional users. Instead, all world management functions are implemented within media player device 204 such that a world management system (e.g., world management system 314) associated with configuration 500 may be said to be implemented by or integrated into media player device 204. Because the world management system is integrated into media player device 204 in this way, system 100 may access all of real-time acoustic propagation data 316 (i.e., both world propagation data 316-1 and listener propagation data 316-2) from media player device 204, as shown.

As system 100 accesses real-time acoustic propagation data 316 from media player device 204 and accesses audio stream data 312 from any of the audio sources described herein, system 100 may render composite binaural audio stream 318 in any of the ways described herein. As shown, upon rendering composite binaural audio stream 318, system 100 may also transmit composite binaural audio stream 318 to media player device 204 for presentation to user 202 as user 202 experiences the single-user extended reality world.

As illustrated in FIG. 5 by the depiction of system 100 on an edge of a network 502, system 100 may, in certain examples, be implemented as a network-edge-deployed server separate from media player device 204. Network 502 may provide data delivery means between server-side extended reality provider systems that are not explicitly shown in FIG. 5 and client-side devices such as media player device 204. While such extended reality provider systems are not explicitly shown in FIG. 5 or elsewhere in the instant disclosure, it will be understood that such systems may be implemented in conjunction with configuration 500 and other such audio-related configurations described herein in order to provide video data and/or other non-audio-related data representative of an extended reality world to media player device 204.

In order to distribute extended reality content from provider systems to client devices such as media player device 204, network 502 may include a provider-specific wired or wireless network (e.g., a cable or satellite carrier network, a mobile telephone network, a traditional telephone network, a broadband cellular data network, etc.), the Internet, a wide area network, a content delivery network, and/or any other suitable network or networks. Extended reality content may be distributed using any suitable communication technologies implemented or employed by network 502. Accordingly, data may flow between extended reality provider systems and media player device 204 using any communication technologies, devices, media, and protocols as may serve a particular implementation.

The network-edge-deployed server upon which system 100 is shown to be implemented may include one or more servers and/or other suitable computing systems or resources that may interoperate with media player device 204 with a low enough latency to allow for the real-time offloading of audio processing described herein. For example, the network-edge-deployed server may leverage MEC technologies to enable cloud computing capabilities at the edge of a cellular network (e.g., a 5G cellular network in certain implementations, or any other suitable cellular network associated with any other generation of technology in other implementations). In other examples, a network-edge-deployed server may be even more localized to media player device 204, such as by being implemented by computing resources on a same local area network with media player device 204 (e.g., by computing resources located within a home or office of user 202), or the like.

Because of the low-latency nature of network-edge-deployed servers such as MEC servers or the like, system 100 may be configured to receive real-time acoustic propagation data from media player device 204 and return corresponding composite binaural audio stream data to media player device 204 with a small enough delay that user 202 perceives the presented audio as being instantaneously responsive to his or her actions (e.g., head turns, etc.). For example, real-time acoustic propagation data 316 accessed by the network-edge-deployed server implementing system 100 may include listener propagation data 316-2 representative of a real-time pose (e.g., including a position and an orientation) of avatar 202 at a first time while user 202 is experiencing world 206, and the transmitting of composite binaural audio stream 318 by the network-edge-deployed server is performed so as to provide composite binaural audio stream 318 to media player device 204 at a second time that is within a predetermined latency threshold after the first time. For instance, the predetermined latency threshold may be between 20 ms to 50 ms, less than 100 ms, or any other suitable threshold amount of time that is determined, in a psychoacoustic analysis of users such as user 202, to result in sufficiently low-latency responsiveness to immerse the users in the extended reality world without being perceivable that the audio being presented has any delay.

FIG. 6 illustrates an exemplary multi-user configuration 600 in which different implementations of system 100 (e.g., extended reality audio processing systems 100-1 and 100-2 ("system 100-1" and "system 100-2")) operate to provide respective composite binaural audio streams 318 (e.g., composite binaural audio streams 318-1 through 318-N) for a multi-user extended reality world. In configuration 600, the extended reality world being experienced by users 202 (e.g., users 202-1 through 202-N) is a shared, multi-user extended reality world managed by an extended reality world management system separate from the respective media player devices 204 (e.g., media player devices 204-1 through 204-N) used by users 202.

Specifically, as shown, a world management server 602 manages and provides world propagation data 316-1 for all of users 202 experiencing the extended reality world. Specifically, each media player device 204-1 is shown to transmit to world management server 602 a respective state data stream 604 (e.g., a state data stream 604-1 from media player device 204-1, a state data stream 604-2 from media player device 204-2, and so forth) representative of respective state data for the dynamic extended reality experience of the respective user 202 within the shared, multi-user world. In contrast with the exemplary implementation of system 100 illustrated in configuration 500 described above, systems 100-1 and 100-2 in configuration 600 are shown to access different types of real-time acoustic propagation data 316 from different sources due to the fact that world management server 602 and media player device 204 are separate and distinct from one another, rather than integrated with one another. Specifically, as shown, each implementation of system 100 in configuration 600 accesses world propagation data 316-1 (e.g., a relevant subset of all the data received and managed by world management server 602 including state data streams 604-1 through 604-N (labeled "604-1 . . . N" in FIG. 6)) from world management server 602, while accessing respective listener propagation data 316-2 (e.g., listener propagation 316-2-1 through 316-2-N) from respective media player devices 204-1.

In some examples, each media player device 204 may be associated with a dedicated implementation of system 100, such that there is a one-to-one ration of media player devices 204 and implementations of system 100. For example, as shown, system 100-1 is configured to serve media player device 204-1 in a one-to-one fashion (i.e., without serving any other media player device 204). In other examples, an implementation of system 100 may be configured to serve a plurality of media player devices 204. For instance, as shown, system 100-2 is configured to serve media player devices 204-1 through 204-N in a one-to-many fashion.

FIG. 7 illustrates an exemplary live capture configuration 700 in which system 100 operates to provide composite binaural audio stream 318 for an extended reality world generated based on a live capture of a real-world scene 702. In configuration 700, the extended reality world being experienced by user 202 is generated based on a live capture of real-world scene 702 and, similar to world management server 602 in configuration 600, is managed by a live capture management system 704 that is separate from media player device 204.

As shown in FIG. 7, a plurality of microphones 706 (e.g., microphones 706-1 through 706-5) may be positioned at various locations with respect to real-world scene 702 so as to capture audio originating from various audio sources within real-world scene 702. For example, real-world scene 702 may be a location where a real-world event such as an athletic event or music concert is ongoing, and microphones 706 may be positioned at various locations around the court or field in the case of the athletic event, around the stage in the case of the concert, or in any other locations as may serve a particular real-world scene being captured. As shown, each microphone 706 is represented as a symbol depicting a capture pattern of the microphone. For example, microphones 706-1 through 706-4 are each illustrated as having directional (e.g., cardioid) capture patterns that are facing inward toward real-world scene 702, while microphone 706-5, which is positioned in the center of real-world scene 702, is shown to have an omnidirectional capture pattern configured to capture sounds originating from all directions approximately equally.

Live capture management system 704 may receive and manage data representative of various aspects of real-world scene 702 including, for example, where each of microphones 706 are located with respect to one another, as well as with respect to other objects (e.g., occluding objects, etc.) within real-world scene 702, the respective capture patterns and how each of microphones 706 are oriented with respect to these capture patterns, and so forth. As such, live capture management system 704 may track and manage world propagation data 316-1 associated with real-world scene 702, and may provide world propagation data 316-1 to system 100. As with other configurations described above, the implementation of system 100 in configuration 700 may access listener propagation data 316-2 from media player device 204. As shown, live capture management system 704 may also receive audio data captured by each of microphones 706 and, as such, may also provide audio stream data 312 to system 100.

While configuration 700 illustrates extended reality content captured from a real-world scene and distributed to a single implementation of system 100 and a single media player device 204, it will be understood that, in certain configurations, extended reality content generated based on real-world scene 702 may be provided to a plurality of implementations of system 100 and/or to a plurality of media player devices 204 used by a plurality of users 202. Additionally, it will be understood that, while captured audio and/or video content representative of live-captured extended reality world may be used exclusively in certain examples, other examples may further include content representative of virtual (i.e., non-captured) objects. For example, the content representative of the virtual objects may be merged with the captured extended reality content to augment the content captured from real-world scene 702.

Figure 8:
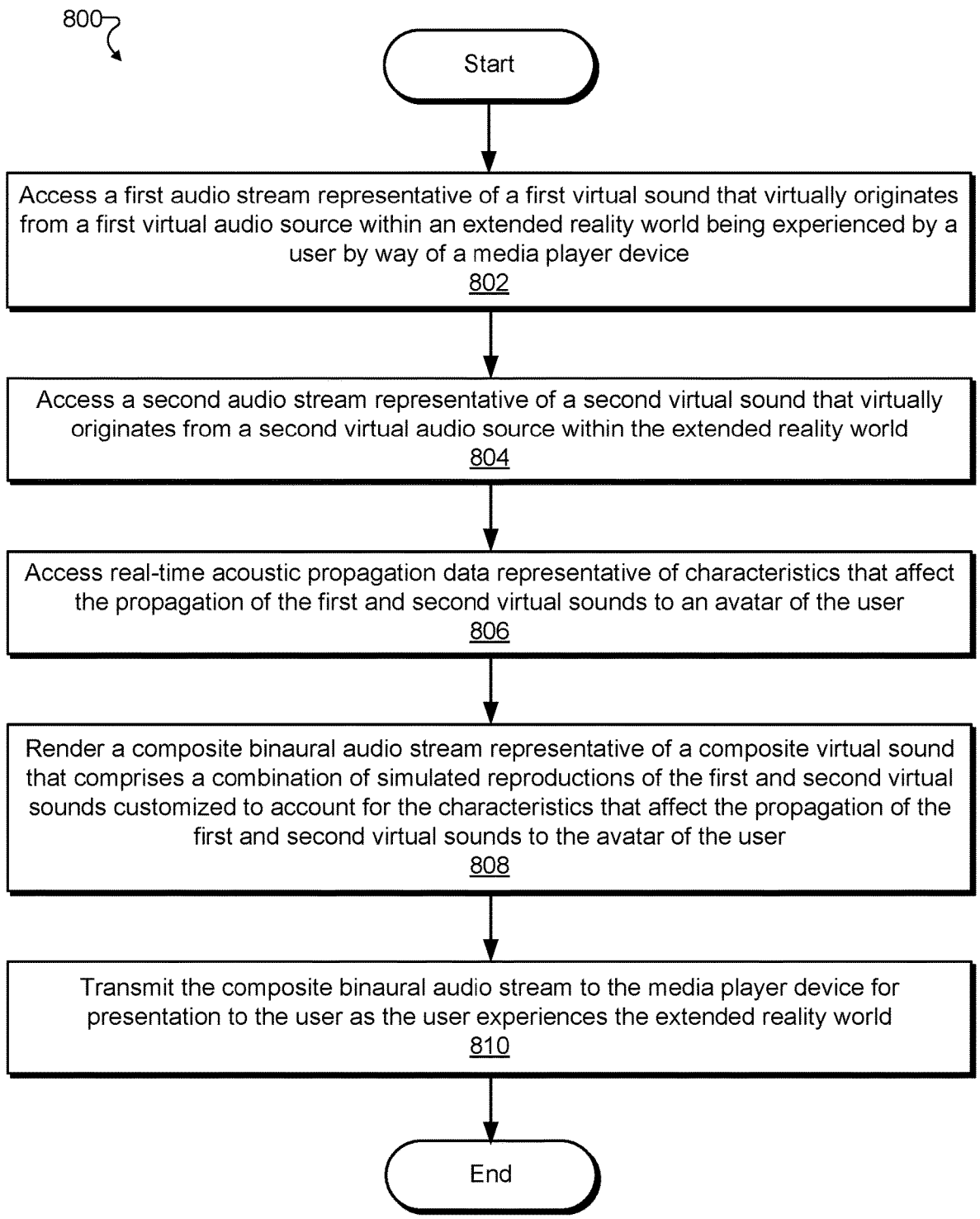
FIG. 8 illustrates an exemplary method for providing a composite audio stream for an extended reality world according to principles described herein.

FIG. 8 illustrates an exemplary method for providing a composite audio stream for an extended reality world. While FIG. 8 illustrates exemplary operations according to one embodiment, other embodiments may omit, add to, reorder, and/or modify any of the operations shown in FIG. 8. One or more of the operations shown in FIG. 8 may be performed by system 100, any components included therein, and/or any implementation thereof.

In operation 802, an extended reality audio processing system may access a first audio stream representative of a first virtual sound that virtually originates from a first virtual audio source within an extended reality world. For example, the extended reality world may be experienced by a user by way of a media player device. Operation 802 may be performed in any of the ways described herein.

In operation 804, the extended reality audio processing system may access a second audio stream representative of a second virtual sound that virtually originates from a second virtual audio source within the extended reality world. In some examples, the second virtual audio source may be distinct from the first virtual audio source. Operation 804 may be performed in any of the ways described herein.

In operation 806, the extended reality audio processing system may access real-time acoustic propagation data representative of characteristics that affect the propagation of the first and second virtual sounds to an avatar of the user. In some examples, the extended reality audio processing system may access the real-time acoustic propagation data as the first and second virtual sounds propagate to the avatar of the user within the extended reality world. Operation 806 may be performed in any of the ways described herein.

In operation 808, the extended reality audio processing system may render a composite binaural audio stream. The composite binaural audio stream may be representative of a composite virtual sound that comprises a combination of simulated reproductions of the first and second virtual sounds. The simulated reproductions may be customized to account for the characteristics that affect the propagation of the first and second virtual sounds to the avatar of the user. In some examples, the extended reality audio processing system may render the composite binaural audio stream based on the first audio stream accessed in operation 802, the second audio stream accessed in operation 804, and the real-time acoustic propagation data accessed in operation 806. Additionally, the extended reality audio processing system may render the composite binaural audio stream as the first and second virtual sounds propagate to the avatar of the user within the extended reality world. Operation 808 may be performed in any of the ways described herein.

In operation 810, the extended reality audio processing system may transmit the composite binaural audio stream rendered in operation 808. For example, the extended reality audio processing system may transmit the composite binaural audio stream to the media player device for presentation to the user as the user experiences the extended reality world. Operation 810 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
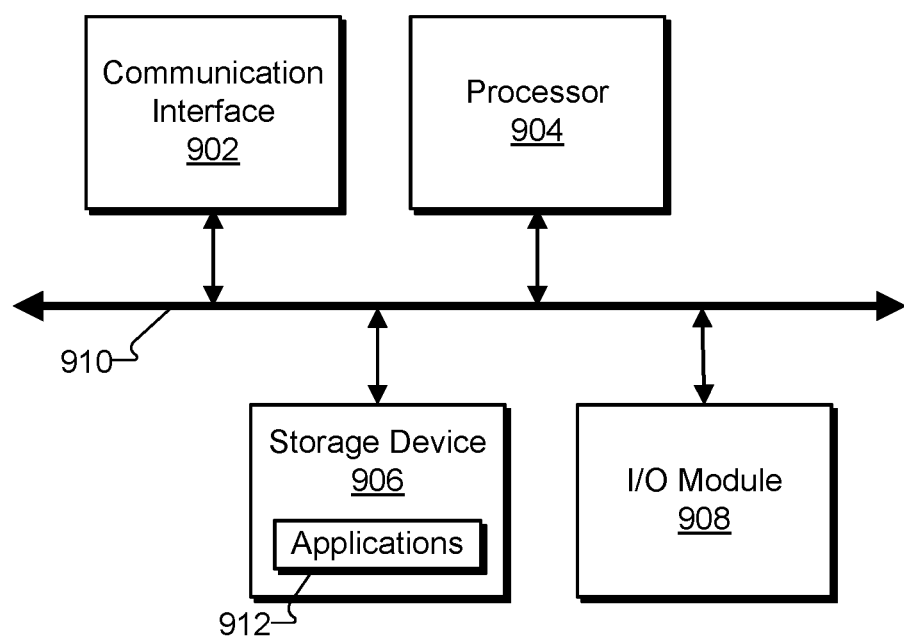
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with facilities 102 and/or 104 of system 100. Likewise, storage facility 106 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by an audio processing system, audio stream data representative of a plurality of virtual sounds that virtually originate from virtual audio sources within an extended reality world, the plurality of virtual sounds including
        real-time captured speech originating from a speaking user as the speaking user experiences the extended reality world, and
        a prerecorded or synthesized sound originating from a real audio source distinct from the speaking user;
    accessing, by the audio processing system as the plurality of virtual sounds propagate within the extended reality world from the virtual audio sources to a listening avatar of a listening user, acoustic propagation data representative of characteristics that affect the propagation of the plurality of virtual sounds to the listening avatar; and
    rendering, by the audio processing system as the plurality of virtual sounds propagate to the listening avatar and based on the audio stream data and the acoustic propagation data, a composite binaural audio stream representative of a composite virtual sound that comprises a combination of simulated reproductions of the plurality of virtual sounds, the simulated reproductions customized to account for the characteristics that affect the propagation of the plurality of virtual sounds to the listening avatar.

2. The method of claim 1, wherein the extended reality world is a multi-user extended reality world being jointly experienced by a plurality of users by way of a plurality of respective media player devices, the plurality of users including the listening user and the speaking user.

3. The method of claim 2, wherein the virtual audio sources within the multi-user extended reality world include a speaking avatar associated with the speaking user, the speaking avatar located proximate to the listening avatar within the multi-user extended reality world such that the real-time captured speech originating from the speaking user propagates from the speaking avatar to the listening avatar to be rendered in the composite binaural audio stream.

4. The method of claim 1, wherein:
the virtual audio sources within the extended reality world include a non-player audio source that corresponds to the real audio source and is represented within the extended reality world as a diegetic media source, an embodied intelligent assistant, or a non-player character;
the non-player audio source virtually originates the prerecorded or synthesized sound within the extended reality world; and
the non-player audio source is located proximate to the listening avatar within the extended reality world such that the prerecorded or synthesized sound originating from the real audio source propagates from the non-player audio source to the listening avatar to be rendered in the composite binaural audio stream.

5. The method of claim 1, wherein:
the audio processing system is a Multi-access Edge Computing (MEC) server separate from and communicatively coupled to respective media player devices of the listening user and the speaking user;
the acoustic propagation data includes listener propagation data representative of a real-time pose of the listening avatar as the listening user experiences the extended reality world, the real-time pose including a position and an orientation of the listening avatar at a first time; and
the rendering of the composite binaural audio stream by the MEC server is performed with low enough latency that the composite binaural audio stream is provided to the media player device of the listening user at a second time that is within a predetermined latency threshold after the first time.

6. The method of claim 1, wherein:
the extended reality world is generated based on a live capture of a real-world scene and is managed by a live capture management system separate from a media player device of the listening user; and
the acoustic propagation data includes
listener propagation data accessed from the media player device, and
world propagation data accessed from the live capture management system, the world propagation data associated with the real-world scene and tracked and managed by the live capture management system.

7. The method of claim 1, wherein the rendering of the composite binaural audio stream includes:

decoding the audio stream data representative of the plurality of virtual sounds to generate raw audio stream data;
generating, based on the raw audio stream data, a three-dimensional (3D) audio representation of the plurality of virtual sounds that is customized to account for the characteristics that affect the propagation of the plurality of virtual sounds to the listening avatar;
generating a composite binaural raw audio stream representative of the 3D audio representation of the plurality of virtual sounds; and
encoding the composite binaural raw audio stream to generate the composite binaural audio stream for transmission to a media player device used by the listening user to experience the extended reality world.

8. The method of claim 1, further comprising transmitting, by the audio processing system, the composite binaural audio stream to a media player device used by the listening user to experience the extended reality world, the composite binaural audio stream transmitted for presentation to the listening user as the user experiences the extended reality world.

9. A system comprising:
a memory storing instructions; and
a processor communicatively coupled to the memory and configured to execute the instructions to:
access audio stream data representative of a plurality of virtual sounds that virtually originate from virtual audio sources within an extended reality world, the plurality of virtual sounds including
real-time captured speech originating from a speaking user as the speaking user experiences the extended reality world, and
a prerecorded or synthesized sound originating from a real audio source distinct from the speaking user;
access, as the plurality of virtual sounds propagate within the extended reality world from the virtual audio sources to a listening avatar of a listening user, acoustic propagation data representative of characteristics that affect the propagation of the plurality of virtual sounds to the listening avatar; and render, as the plurality of virtual sounds propagate to the listening avatar and based on the audio stream data and the acoustic propagation data, a composite binaural audio stream representative of a composite virtual sound that comprises a combination of simulated reproductions of the plurality of virtual sounds, the simulated reproductions customized to account for the characteristics that affect the propagation of the plurality of virtual sounds to the listening avatar.

10. The system of claim 9, wherein the extended reality world is a multi-user extended reality world being jointly experienced by a plurality of users by way of a plurality of respective media player devices, the plurality of users including the listening user and the speaking user.

11. The system of claim 10, wherein the virtual audio sources within the multi-user extended reality world include a speaking avatar associated with the speaking user, the speaking avatar located proximate to the listening avatar within the multi-user extended reality world such that the real-time captured speech originating from the speaking user propagates from the speaking avatar to the listening avatar to be rendered in the composite binaural audio stream.

12. The system of claim 9, wherein:
the virtual audio sources within the extended reality world include a non-player audio source that corresponds to the real audio source and is represented within the extended reality world as a diegetic media source, an embodied intelligent assistant, or a non-player character;

the non-player audio source virtually originates the prerecorded or synthesized sound within the extended reality world; and the non-player audio source is located proximate to the listening avatar within the extended reality world such that the prerecorded or synthesized sound originating from the real audio source propagates from the non-player audio source to the listening avatar to be rendered in the composite binaural audio stream.

13. The system of claim 9, wherein:

the audio processing system is a Multi-access Edge Computing (MEC) server separate from and communicatively coupled to respective media player devices of the listening user and the speaking user;

the acoustic propagation data includes listener propagation data representative of a real-time pose of the listening avatar as the listening user experiences the extended reality world, the real-time pose including a position and an orientation of the listening avatar at a first time; and the rendering of the composite binaural audio stream by the MEC server is performed with low enough latency that the composite binaural audio stream is provided to the media player device of the listening user at a second time that is within a predetermined latency threshold after the first time.

14. The system of claim 9, wherein:

the extended reality world is generated based on a live capture of a real-world scene and is managed by a live capture management system separate from a media player device of the listening user; and the acoustic propagation data includes listener propagation data accessed from the media player device, and world propagation data accessed from the live capture management system, the world propagation data associated with the real-world scene and tracked and managed by the live capture management system.

15. The system of claim 9, wherein the rendering of the composite binaural audio stream includes:

decoding the audio stream data representative of the plurality of virtual sounds to generate raw audio stream data;

generating, based on the raw audio stream data, a three-dimensional (3D) audio representation of the plurality of virtual sounds that is customized to account for the characteristics that affect the propagation of the plurality of virtual sounds to the listening avatar;

generating a composite binaural raw audio stream representative of the 3D audio representation of the plurality of virtual sounds; and encoding the composite binaural raw audio stream to generate the composite binaural audio stream for transmission to a media player device used by the listening user to experience the extended reality world.

16. The system of claim 9, wherein the processor is further configured to execute the instructions to transmit the composite binaural audio stream to a media player device used by the listening user to experience the extended reality world, the composite binaural audio stream transmitted for presentation to the listening user as the user experiences the extended reality world.

17. A non-transitory computer-readable medium storing instructions that, when executed, direct a processor of a computing device to:

access audio stream data representative of a plurality of virtual sounds that virtually originate from virtual audio sources within an extended reality world, the plurality of virtual sounds including real-time captured speech originating from a speaking user as the speaking user experiences the extended reality world, and a prerecorded or synthesized sound originating from a real audio source distinct from the speaking user;

access, as the plurality of virtual sounds propagate within the extended reality world from the virtual audio sources to a listening avatar of a listening user, acoustic propagation data representative of characteristics that affect the propagation of the plurality of virtual sounds to the listening avatar; and render, as the plurality of virtual sounds propagate to the listening avatar and based on the audio stream data and the acoustic propagation data, a composite binaural audio stream representative of a composite virtual sound that comprises a combination of simulated reproductions of the plurality of virtual sounds, the simulated reproductions customized to account for the characteristics that affect the propagation of the plurality of virtual sounds to the listening avatar.

18. The non-transitory computer-readable medium of claim 17, wherein the extended reality world is a multi-user extended reality world being jointly experienced by a plurality of users by way of a plurality of respective media player devices, the plurality of users including the listening user and the speaking user.

19. The non-transitory computer-readable medium of claim 17, wherein the virtual audio sources within the multi-user extended reality world include a speaking avatar associated with the speaking user, the speaking avatar located proximate to the listening avatar within the multi-user extended reality world such that the real-time captured speech originating from the speaking user propagates from the speaking avatar to the listening avatar to be rendered in the composite binaural audio stream.

20. The non-transitory computer-readable medium of claim 17, wherein:

the virtual audio sources within the extended reality world include a non-player audio source that corresponds to the real audio source and is represented within the extended reality world as a diegetic media source, an embodied intelligent assistant, or a non-player character;

the non-player audio source virtually originates the prerecorded or synthesized sound within the extended reality world; and the non-player audio source is located proximate to the listening avatar within the extended reality world such that the prerecorded or synthesized sound originating from the real audio source propagates from the non-player audio source to the listening avatar to be rendered in the composite binaural audio stream.

\* \* \* \* \*